United States Patent
Hassan et al.

(10) Patent No.: US 11,063,936 B2
(45) Date of Patent: Jul. 13, 2021

(54) ENCRYPTION PARAMETER SELECTION

(71) Applicant: Microsoft Technology Licensing, LLC, Redmond, WA (US)

(72) Inventors: Amer A. Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/057,503

(22) Filed: Aug. 7, 2018

(65) Prior Publication Data

US 2020/0053076 A1  Feb. 13, 2020

(51) Int. Cl.
| | | |
|---|---|---|
| *H04L 29/06* | (2006.01) | |
| *G06F 21/32* | (2013.01) | |
| *G06F 21/60* | (2013.01) | |
| *H04L 9/30* | (2006.01) | |

(52) U.S. Cl.
CPC .......... *H04L 63/0861* (2013.01); *G06F 21/32* (2013.01); *G06F 21/602* (2013.01); *H04L 9/302* (2013.01); *H04L 9/304* (2013.01); *H04L 63/102* (2013.01); *G06F 2221/2103* (2013.01)

(58) Field of Classification Search
CPC ..... H04L 63/0861; H04L 9/302; H04L 9/304; H04L 63/102; H04L 9/0825; H04L 63/0428; H04L 9/0866; H04L 9/3231; H04L 9/32; H04L 63/083; G06F 21/32; G06F 21/602; G06F 2221/2103; H04W 12/00

See application file for complete search history.

(56) References Cited

U.S. PATENT DOCUMENTS

| | | | |
|---|---|---|---|
| 6,940,976 B1 | 9/2005 | Matyas et al. | |
| 9,276,741 B2* | 3/2016 | Mantri | H04L 9/0869 |
| 9,497,191 B2* | 11/2016 | Pall | H04L 63/083 |
| 9,853,955 B2* | 12/2017 | Mintz | H04L 9/3231 |
| 2001/0025342 A1* | 9/2001 | Uchida | H04L 9/3231 |
| | | | 713/186 |
| 2006/0021037 A1* | 1/2006 | Zhuk | G06F 21/10 |
| | | | 726/22 |
| 2006/0080547 A1* | 4/2006 | Higashiura | G06F 21/34 |
| | | | 713/186 |

(Continued)

FOREIGN PATENT DOCUMENTS

EP  2377064 A1  10/2011

OTHER PUBLICATIONS

"International Search Report and Written Opinion Issued in PCT Application No. PCT/US2019/038818", dated Aug. 22, 2019, 13 Pages.

(Continued)

*Primary Examiner* — Abu S Sholeman
(74) *Attorney, Agent, or Firm* — Schwegman Lundberg & Woessner, P.A.

(57) ABSTRACT

Disclosed in some examples are methods, systems, devices, and machine-readable mediums for securing biometric data using an encryption technique that does not require key storage or distribution. In some examples, a first biometric template of a user is input into a function that selects or determines parameters (such as an encryption key) of an encryption function that is then used to encrypt a second biometric template of the user.

20 Claims, 6 Drawing Sheets

(56) References Cited

U.S. PATENT DOCUMENTS

| | | | | |
|---|---|---|---|---|
| 2008/0072063 | A1* | 3/2008 | Takahashi | H04L 9/3231 |
| | | | | 713/186 |
| 2008/0215890 | A1* | 9/2008 | Buer | H04L 63/0861 |
| | | | | 713/186 |
| 2009/0177939 | A1* | 7/2009 | Chabanne | G06F 21/32 |
| | | | | 714/752 |
| 2009/0222670 | A1* | 9/2009 | Mehta | G06F 21/32 |
| | | | | 713/186 |
| 2013/0103951 | A1* | 4/2013 | Klevan | H04L 9/3234 |
| | | | | 713/186 |
| 2013/0263252 | A1* | 10/2013 | Lien | G06F 1/3215 |
| | | | | 726/19 |
| 2013/0339748 | A1* | 12/2013 | Stinson, III | G06F 21/34 |
| | | | | 713/186 |
| 2015/0016698 | A1* | 1/2015 | Kerr | G06K 9/00892 |
| | | | | 382/125 |
| 2015/0117639 | A1* | 4/2015 | Feekes | G09C 1/00 |
| | | | | 380/28 |
| 2016/0197899 | A1* | 7/2016 | Liu | H02M 3/07 |
| | | | | 713/176 |
| 2016/0219046 | A1 | 7/2016 | Ballard et al. | |
| 2016/0285866 | A1* | 9/2016 | Allen | H04L 63/0861 |
| 2017/0005794 | A1 | 1/2017 | Paddon et al. | |
| 2017/0142109 | A1* | 5/2017 | Mandal | H04L 63/06 |
| 2018/0108020 | A1 | 4/2018 | Thatte et al. | |

OTHER PUBLICATIONS

Thakkar, Danny, "What is a biometric template? Is it secure?", Retrieved from: https://www.bayometric.com/biometric-template-security/, Retrieved Date: Aug. 22, 2018, 9 Pages.

* cited by examiner

ENCRYPTION PARAMETER SELECTION

BACKGROUND

Current methods of authenticating users on computer systems typically rely upon a username and password and in some instances a one-time code. These methods have a number of disadvantages. For example, the strongest passwords are those that have random characters rather than words or phrases. However, these random passwords are difficult to remember, so users often chose passwords with words or phrases that are vulnerable to dictionary attacks. In a dictionary attack, the attackers try various combinations of common words and phrases from a list of common words and phrases called a dictionary. Additionally, so-called two factor authentication safeguards that require use of a one-time code sent to a second trusted computing device (such as a smartphone) are also vulnerable. For example, cellular telephone providers have been tricked into providing a malicious individual with access to the legitimate individual's text messages.

Biometrics are measurable characteristics of a person that are capable of identifying that person within a particular level of uniqueness. As the level of uniqueness for several common biometrics is particularly high, biometrics are particularly well suited for authenticating a user. For example, it is believed that fingerprints are unique to each individual and may serve as a very accurate indicator that the person is who they say they are. Example biometrics with high levels of uniqueness include fingerprints, iris structure, retina structure, DNA composition, facial data (e.g., feature distances), voice prints, ear structure, and the like.

To utilize biometrics to authenticate a user, the user first sets up biometric authentication by presenting a sample of their biometric to a computing device for capture or scanning. For example, by pressing a finger on a fingerprint sensor, by allowing a picture of an iris, a retinal scanning, or a facial scan. This biometric data is captured and sampled into a set of one or more data points called a biometric template. A biometric template is a digital representation of one or more features extracted from the scanned biometric data. For example, locations of ridges and valleys in a fingerprint. This template is stored. Once this initial template is stored, the user is allowed to subsequently authenticate with their biometrics. The initial saved biometric template may be called an exemplar biometric template as it is used as an exemplar—a ground truth biometric that identifies a user and to which biometric templates submitted during subsequent authentication attempts are compared. When a person attempts to authenticate a device using biometrics, the person presents their biometric to the computing device for capture or scanning. This biometric data is captured and sampled into one or more data points and stored as a "challenge template." The challenge template is compared to the exemplar template and if they match, the user is authenticated and granted access to one or more computer resources secured by the biometric data. If the templates do not match, the user is not authenticated and may be denied access to one or more computerized resources.

In contrast to username and passwords, biometrics do not require memorization of a password and so they cannot be forgotten. Moreover, biometrics are difficult to fake. For example, it would be difficult for a malicious actor to: 1.) obtain a retina scan of an individual and 2.) reproduce that retina scan in front of retina scanner. Biometrics are thus an enticing option for application developers who are interested in a secure authentication method.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
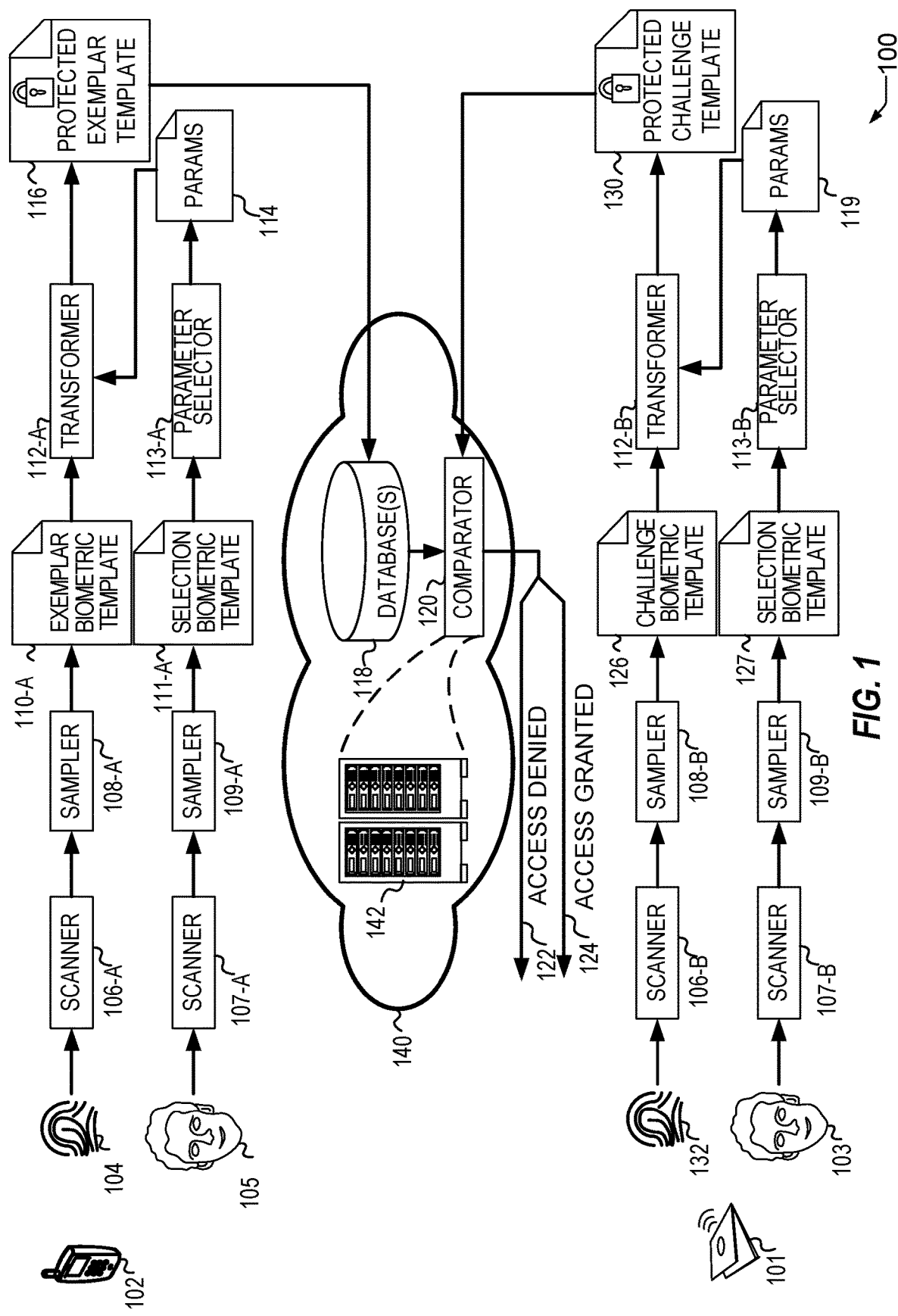
FIG. 1 illustrates a schematic data flow of a biometric system according to some examples of the present disclosure.

Despite the benefits of biometric authentication, the use of biometrics has also introduced some drawbacks. For example, as previously described, biometric authentication requires users to register their biometric data (e.g., provide an exemplar biometric). If a user has multiple devices and/or accounts that they wish to authenticate with using biometrics, they typically need to register by providing a biometric exemplar for each of these devices and accounts. This registration time is often annoying for the user. Moreover, in the case of some biometrics such as fingerprints, the user must remember which fingerprint they submitted to each device as the exemplar. This may cause user confusion when trying to subsequently authenticate. To eliminate these issues, the exemplar biometric data may be stored in a network-based (e.g., cloud based) server that would then be communicatively coupled to the user's devices. When a user wishes to authenticate with one of their devices, the challenge biometric is then sent to the network-based server which determines whether the user is authenticated by comparing the challenge template to the exemplar template. This allows for a single registration procedure across all of the user's devices.

Regardless of where the biometric exemplar is stored (within each device or in a network-based server), secure biometric storage is important since, in contrast to passwords, biometric data cannot be changed if the user's data is stolen. By moving biometric templates to the cloud, the authentication service becomes an enticing target for hackers. One way of securing this data is to use encryption. For example, encryption may include transforming the biometric template using an encryption function $e(x,k)$ from a first form to an encrypted form, where x is the biometric template, and k is a secret key. An attacker that is able to access the stored encrypted biometric data may not be able to leverage this data without knowing the key used to decrypt the biometric template.

Unlike a password where the user either knows the password or not, a series of scans of the same fingerprint, iris, face, etc. . . . may produce slightly different biometric data due to the accuracy of the scanner, positional differences of the user, ambient light differences, and the like. Because biometrics typically rely upon the locations of (or differences in locations of) various detected features (e.g., ridges or swirls on a fingerprint, facial features . . . ) and because the encryption algorithm scrambles the biometric data (scrambling these locations and/or distances), two very close biometric templates that are both encrypted by the same key may be very different. To handle these differences, the biometric templates may be compared when decrypted. Thus, the encrypted exemplar is decrypted during an authentication attempt by using the key to produce the original exemplar which is then compared with the challenge template. This allows a direct comparison of the newly scanned biometric with the exemplar. Tolerances for error may then be utilized—e.g., a threshold distance between the measured points on a fingerprint, for example. Nevertheless, in order to decrypt the exemplar biometric template the device performing the authentication must have knowledge of the decryption key and it must be stored which may make the decryption key accessible by attackers. Other types of transformation functions—such as hash functions—suffer from the same problems—that is—the transformed value does not retain the important information used to make decisions on authentication (e.g., the location of the points or distances between points) and thus, an inverse of the function must be stored.

In order to avoid using a decryption key or applying an inverse function, and to avoid minor differences between the challenge template and the exemplar template from presenting problems with authentication, the biometric templates may be quantized prior to their transformation or encryption. That is, for a given sampled biometric point (e.g., a point on a fingerprint), the point may be mapped to the next closest point. Another way of thinking of this is that the biometric may be downsampled. Because the odds have increased that the challenge template may be identical to the exemplar template prior to application of the encryption function and/or the transformation function, the probability that the encrypted or transformed template is identical has also increased. This increases the tolerance for minor changes between the biometric as captured for the exemplar and the challenge. By performing this quantization, it may be possible to compare the encrypted exemplar and the encrypted challenge template without decrypting them first. This approach suffers from the drawback that it reduces the accuracy of the biometric in determining identity.

Yet another approach for resolving this is to capture several biometric exemplars. For example, a user's facial recognition exemplar is captured in a variety of lighting conditions and from a variety of angles. All these exemplars are then encrypted or transformed and stored. Upon a subsequent authentication attempt the encrypted challenge template is compared with all the exemplars. If one of them matches, then the user is authenticated. This approach is costly in terms of storage. While a single template may be relatively small in terms of storage necessary, in an authentication service that may store millions of user's biometric exemplar templates, doubling, tripling, or even quadrupling the amount of storage needed adds up quickly. Additionally, the processing time increases as the authentication system needs to check a challenge template against not one, but two or more exemplar templates. If the authentication service is handling a lot of authentications, this additional processing time is not insignificant.

Finally, it is expected that quantum computing will render many current encryption algorithms unusable. This means that conventional systems to protect biometrics may become obsolete. One family of encryption algorithms that are thought to be secure from quantum-based computing attacks are code-based cryptographic algorithms such as McEliece and Niederreiter encryption algorithms. One known drawback with McEliece encryption, for instance, is that many variants of the McEliece scheme have sought to introduce more structure into the encryption code to reduce the size of the keys which weakens its ultimate security.

Disclosed in some examples are methods, systems, devices, and machine-readable mediums for securing biometric data using an encryption technique that does not require key storage or distribution. In some examples, a first biometric template of a user (called a selection biometric template) is input into a function that selects or determines parameters (such as an encryption key) of an encryption function that is then used to encrypt a second biometric template of the user. For example, a biometric template of a user's fingerprint is used to select or determine one or more McEliece encryption parameters. These parameters are then used to encrypt a second biometric template of a user—e.g., facial recognition data of the user. Example encryption parameters may include a key, a coding algorithm and its generator matrix, a k×k binary non-singular matrix (scrambler matrix) S, a random n×n permutation matrix P, an error vector; and the like. In some examples, the exemplar biometric template is stored in an encrypted form and compared with an encrypted challenge biometric template without decrypting either. In other examples, the exemplar biometric template is decrypted with the help of the selection biometric template and compared with an unencrypted challenge biometric template.

The use of a selection biometric template to determine encryption parameters for another biometric template has a number of advantages over the prior art that enhances the security of biometric storage and the convenience to the user. First, no keys need to be distributed, stored, or managed by the system or by users. The "key" is the selection biometric template that is based upon characteristics of the user. Second, by utilizing biometrics, key size is not an issue—thus techniques that weaken the McEliece encryption are not necessary. Finally, the problem described above related to small variances between otherwise matching exemplar templates and challenge templates is easily solved in a secure manner through at least two possible solutions.

A first solution is to utilize a quantization function on the exemplar template (during registration) and the challenge template (during authentication) prior to their encryption. The encrypted templates may then be directly compared. As noted previously, the use of a quantization function has the drawback of decreased precision and security. However, this drawback is now offset by the use of additional biometrics. That is, if the selection biometric templates are not matching or close between the selection biometric template used to generate the encrypted exemplar template and the selection biometric template used to generate the encrypted challenge template, the templates will not match.

A second solution is to decrypt the encrypted exemplar template using the parameters stored in the user's biometrics. If the authentication processes are performed exclusively on a local device, sensitive data (e.g., the selection template, the selected parameters, and the unencrypted exemplar template) may only be exposed in volatile random-access memory (RAM) and only for a short period of time. The use of protected enclaves and other trusted execution mechanisms, such as Intel Software Guard Extensions (SGX) or ARM TrustZone, may guard against any unauthorized access during this process. In the case where authentication is assisted or happens at an authentication server, the local computing device may transmit both the challenge template and the selection template to the authentication device, which may then use the selection template to determine the selection parameters that are used to decrypt the encrypted exemplar template. The decrypted exemplar template is then compared to the challenge template and a result is returned. Again, the sensitive data is only stored for a short period of time in volatile storage. Like on a local computing device, techniques such as secure enclaves with SGX or ARM TrustZone can safeguard the code that performs this process. While in transmission, this sensitive data may be secured with standard methods, such as Transport Layer Security (TLS). This technique thus ensures that any biometric data is stored very securely, yet very usable.

FIG. 1 illustrates a schematic data flow of a biometric system 100 according to some examples of the present disclosure. During a setup phase, a user may present at least two biometrics 104 and 105 to computing device 102. Example biometrics include a fingerprint, iris, face, retina, facial recognition, and the like to computing device 102. In some examples, the biometrics 104 and 105 are different biometrics (e.g., face recognition and fingerprint), but in other examples, the biometrics 104 and 105 may be different instances of the same biometric (e.g., different fingers for fingerprinting, different sections of a same biometric such as different portions of an iris, and the like). Computing device 102 may include at least two biometric scanners 106-A, 107-A such as a fingerprint reader, iris scanner, retinal scanner, cameras (for facial recognition), and the like. In some examples, a same scanner may digitize both biometrics 104 and 105. The scanners 106-A, 107-A may digitize the biometrics. For example, for a fingerprint the scanner may read the patterns on the user's finger and convert this into a digital representation of those patterns.

Sampler 108-A may convert the digital representation of those patterns to a series of one or more data points. For example, locations of ridges of the fingerprint, distances between facial features (e.g., distances between a nose and mouth) for facial recognition, and the like to produce biometric data based upon biometric 104 called a biometric template. In some examples, the sampler 108-A may be part of the scanner 106-A. The biometric template produced as a result of the setup phase may be called the exemplar biometric template 110-A.

Sampler 109-A may convert the digital representation of the patterns produced by scanner 107-A of biometric 105 to a series of one or more points. For example, locations of ridges of the fingerprint, distances between facial features (e.g., distances between a nose and mouth) for facial recognition, and the like to produce a biometric template based upon biometric 105. The biometric template produced from biometric data 105 may be called the selection biometric template 111-A. In some examples, the sampler 109-A may be part of the scanner 107-A.

Parameter selector 113-A may utilize the selection biometric template 111-A to select one or more encryption parameters. Examples include one or more prime numbers for use in generating a key for a Rivest-Shamir-Adleman (RSA) encryption algorithm; a secret or other value used to produce a Keyed Hash Message Authentication Code (HMAC); one or more McEliece encryption parameters such as a selection of a coding algorithm and its generator matrix, a k×k binary non-singular matrix (scrambler matrix) S, a random n×n permutation matrix P, an error vector, and the like.

Example algorithms to convert between the selection biometric template 111-A and the encryption parameters may include a quantization algorithm which maps specific points to a predetermined number of possibilities which are mapped to a selection of one or more of the above parameters. Other examples include mathematical formulas which act upon the points in the selection template 111-A to produce the one or more parameters. For example, for selecting the key in an RSA algorithm, a product of the x coordinates of the points in the selection biometric template 111-A may be mapped to a first prime number (e.g., if the sum of the points is 11548, the next prime is 11549). The product of they coordinates of the points in the selection biometric template 111-A may be mapped to a second prime number in the same way. The first prime and the second prime are used as p and q to generate the key in the RSA algorithm.

For McEliece encryption, the encrypted message is computed by:

$$y=xG'+e$$

Where e is an error vector, x is the message (e.g., biometric template) to encrypt, and G' is a public generator matrix given by:

$$G'=SGP$$

Where P is a permutation matrix (i.e., a matrix where every row and column contains a single 1 with 0s everywhere else), S is a scrambler matrix, and G is a generator matrix for the particular selected code. The generator matrix is a matrix whose rows form a basis for a linear code. The codewords are all of the linear combinations of the rows of the matrix—that is—the linear code is the row space of the matrix. Any one or more of those parameters may be selected by the selection biometric template. For example, one or more portions of the data in the selection biometric template 111-A may be mapped to values for S (a post processing step may be necessary to ensure S is invertible), one or more portions of the data in the permutation matrix P may indicate which position the '1' is located for each row and column, one or more portions of the data may be mapped to select one or more of a predetermined number of codes, and one or more portions of the data may select the position of the error in the error vector e.

The encryption parameters 114 produced by the parameter selector 113-A may be used as input to the transformer 112-A. Transformer 112-A may transform exemplar biometric template 110-A into a protected exemplar template 116 that is an encrypted biometric template by application of an encryption function using the encryption parameters 114 produced by the selection biometric template 111-A. Example encryption functions include RSA, McEliece, Secure Hash Algorithm (SHA), Advanced Encryption Standard (AES), HMAC, and the like. Transformer 112-A may employ McEliece encryption using one or more linear codes, such as binary Goppa codes. Scanners 106-A, 17-A, samplers 108-A, 109-A, parameter selector 113-A, and transformers 112-A and 113-A may be implemented in hardware or software of the computing device 102. In some examples, one or more of scanners 106-A, 17-A, samplers 108-A, 109-A, parameter selector 113-A, and transformers 112-A and 113-A may be implemented in the network-based authentication service 140.

The protected exemplar template 116 may be stored locally on the computing device 102, or the protected exemplar template 116 may be transferred via a communications network to one or more network based services, such as an authentication service 140. Authentication service 140 may have one or more server computing devices 142, one or more data storage devices (e.g., database(s)) 118, and the like. The server computing devices 142 may include or implement a comparator 120 (e.g., a hardware or software component of the server computing devices 142). The protected exemplar template 116 may be stored in the database 118 and be associated with an identifier of the user (e.g., username, password, or other credential).

When a user wishes to later authenticate using their biometric, the user can use a same computing device or a different computing device. As shown in FIG. 1, components designated as A and B may be the same component on the same device or different instances of a same component on a different computing device. Shown in FIG. 1 a different computing device 101 in the form of a laptop computing device is utilized. As part of an authentication process, the user presents their biometrics 132 (which may be the same biometric as 104) and biometrics 103 (which may be the same as biometric 105) to a scanners 106-B and 107-B on the computing device 101. The sampler 108-B samples the biometric representation produced by the scanner 106-B in a same or similar process as used by the sampler 108-A. This produces a challenge biometric template 126. Similarly, the sampler 109-B samples the biometric representation produced by the scanner 107-B in a same or similar process as used by the sampler 107-A. This produces a selection biometric template 127. Parameter selector 113-B utilizes the selection biometric template 127 in a same way as parameter selector 113-A to produce the encryption parameters 119 (which, if the biometric 103 is the same as biometric 105, should match encryption parameters 114).

Transformer 112-B utilizes encryption parameters 119 (which may be the same function parameters as encryption parameters 114) to apply a same encryption function as applied by transformer 112-A to produce a protected challenge template 130. This may be compared to a stored protected exemplar template 116 locally on the computing device or sent via a communications network to the authentication service 140 for comparison there. For example, comparator 120 may be implemented by computing devices 102 or 101. Comparator 120 may then compare the protected challenge template 130 to the protected exemplar template 116 to output a message or signal 124 granting access if they match and message or signal 122 denying access if they do not. These messages or signals may be instructions to one or more computing devices, such as user computing devices (e.g., 102, and/or 101), a third party server or service, or the like that indicate whether the authentication succeeded or failed.

Comparator 120 may require an exact match—that is unless the protected exemplar template matches the protected challenge template exactly, the access denied message 122 is sent. In other examples, the comparator may have a threshold level of error that may be tolerated and access may still be granted.

In some examples, the computing devices 101 and 102 implement one or more of the scanners (106-A, 106-B, 107-A, and 107-B) and samplers (108-A, 108-B, 109-A, and 109-B), but the authentication service implements one or more of the transformers and parameter selectors (112-A, 113-A, 112-B, and 113-B). For example, the computing device 102 may send both the exemplar biometric template 110-A and selection biometric template 111-A to the authentication service 140. A parameter selector 113-A on the authentication service 140 may determine encryption parameters 114 based upon the selection biometric template 111-A and use those encryption parameters 114 in an encryption algorithm of transformer 112-A (implemented on the authentication service 140) to produce the protected exemplar template 116.

In some examples, during the challenge phase the computing device 101 sends both the (unencrypted) challenge biometric template 126 and the selection biometric template 127 to the authentication service 140 (rather than process them as part of the transformer 112-B and parameter selector 113-B locally). The authentication service 140 uses the selection biometric template in a parameter selector that finds the inverse of the encryption parameters in order to decrypt the protected exemplar template 116 stored in database 118. The decrypted exemplar template and the challenge biometric template 126 may then be compared with comparator 120. In these examples, transformer 112-B is not needed, and parameter selector 113-B is implemented in the authentication service 140 and is utilized to find the inverse of the parameters.

In some examples, in case the protected exemplar template 116 is stolen or compromised, the system may take one or more actions to prevent the use of the protected exemplar template 116 in a replay attack. For example, a user-specific value may be included in the encrypted protected exemplar template (and subsequently provided by the user during the authentication phase). Example user specific values include a random number, a user specified value (e.g., a password), a value in a secure digital certification, and the like. If the protected exemplar template 116 is compromised, the user-specific value may be changed. In other examples, a user-specific value may be included as part of parameter selection. For example, the user specific value may be used in addition to the selection biometric template to select the encryption parameters. In still other examples, a different part of the biometric 105 or conversion of the selection biometric template to parameters may be utilized in response to the protected exemplar template being compromised. In some examples, the user specific value is not a representation of a biometric of a user. These steps may produce a different protected exemplar template 116 and thwart any replay attacks.

Figure 2:
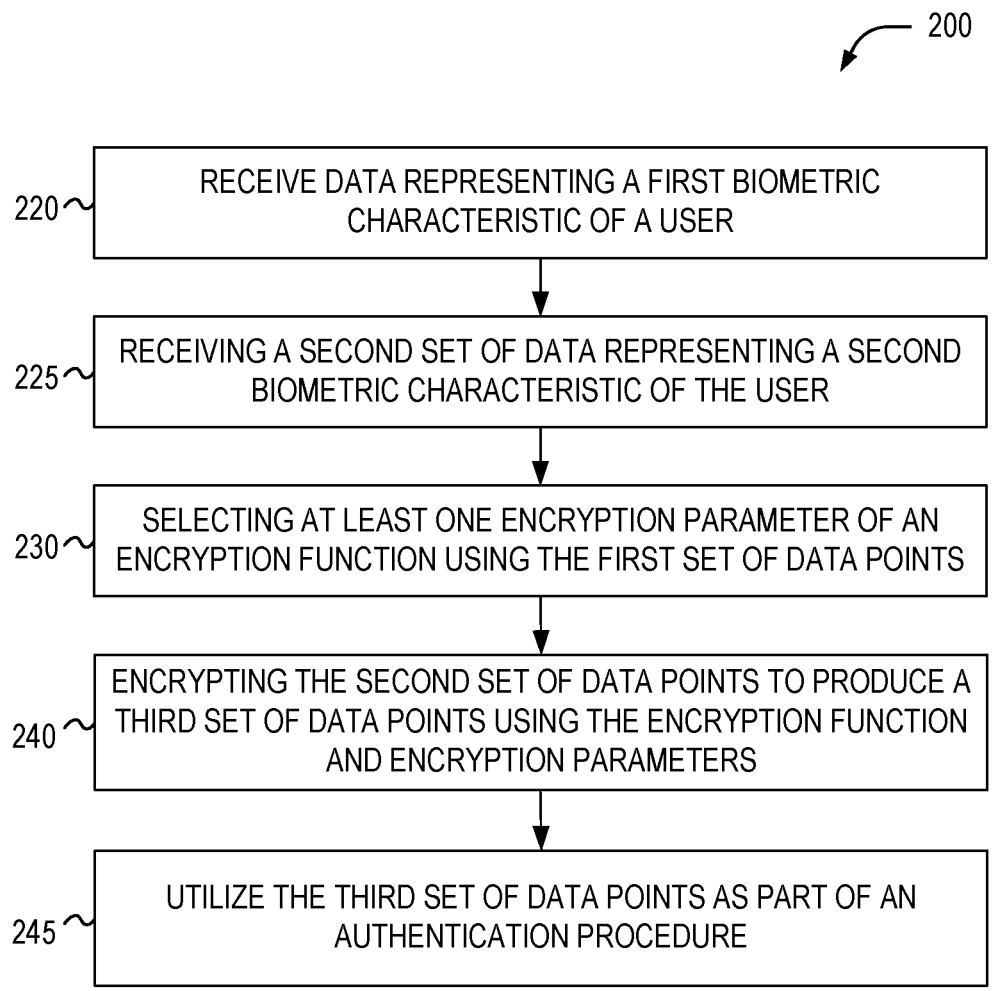
FIG. 2 illustrates a flowchart of a method of utilizing a first biometric template to secure a second biometric template according to some examples of the present disclosure.

Scanners 106-A, 107-A, 106-B and 107B; samplers 108-A, 108-B, 109-A, and 109-B; parameter selectors 113-A and 113-B, and transformers 112-A, 113-A, 112-B, and 113-B may be implemented in hardware or software of the computing device 102. While certain functionality is shown in FIG. 1 as taking place on certain devices, a person of ordinary skill in the art with the benefit of the present disclosure will appreciate that other functional organizations may be utilized depending on the desired implementation. For example, one or more of scanners 106-A, 107-A, 106-B and 107-B; samplers 108-A, 108-B, 109-A, and 109-B; parameter selectors 113-A and 113-B, and transformers 112-A, 113-A, 112-B, and 113-B may be implemented in the network-based authentication service 140 and one or more of databases 118 and comparator 120 may be implemented in a device 102, or 101. In some examples, as previously noted, a quantization operation may be performed on the biometric templates prior to transformation. The quantizer is not shown in FIG. 1 for clarity, but the system 100 may include quantizers to perform the quantization.

FIG. 2 illustrates a flowchart of a method 200 of utilizing a first biometric template to secure a second biometric template according to some examples of the present disclosure. At operation 220, the computing device may receive a set of one or more data points such as data representing a first biometric characteristic of the user. For example, a biometric template represented by a set of data points produced by the sampler as applied to data captured by the scanning device. At operation 225, the computing device may receive a set of one or more data points such as data representing a second biometric characteristic of the user. For example, a second biometric template produced by a sampler as applied to data captured by a scanning device. The first and second biometrics may be different biometrics (e.g., representing different user physical characteristics) or may be different instances of the same biometric (e.g., different portions of a same physical characteristic such as different portions of an iris, different portions of a same fingerprint, different fingerprints, and the like).

At operation 230, the computing device may select at least one encryption parameter of an encryption function using the first set of data points representing the first biometric characteristic of the user. As noted, these parameters may include two large primes for the RSA algorithm, one or more McEliece encryption parameters such as a selection of a coding algorithm and its generator matrix, a k×k binary non-singular matrix (scrambler matrix) S, a random n×n permutation matrix P, an error vector, and the like.

At operation 240, the encryption parameters determined at operation 230 are used in an encryption function to encrypt the second set of data points of the second biometric characteristic of the user producing a third set of encrypted data points. At operation 245, the system may utilize the third set of data points as part of an authentication procedure. For example, the device may transmit the third set of data points to an authentication service as either an encrypted exemplar template (e.g., as part of a registration) for storage (e.g., during registration) or as an encrypted challenge template (e.g., as part of an authentication attempt) for comparison to the stored exemplar and for returning an indication that the user is either authenticated or not authenticated. As previously noted, in some examples, during an authentication, the computing device may not encrypt the challenge biometric template (aside from a TLS encryption during transport), but may instead send the unencrypted challenge biometric template and the unencrypted selection biometric challenge template. The network-based authentication service may utilize the selection biometric template to decrypt the encrypted exemplar biometric template for comparison to the challenge biometric template.

Figure 3:
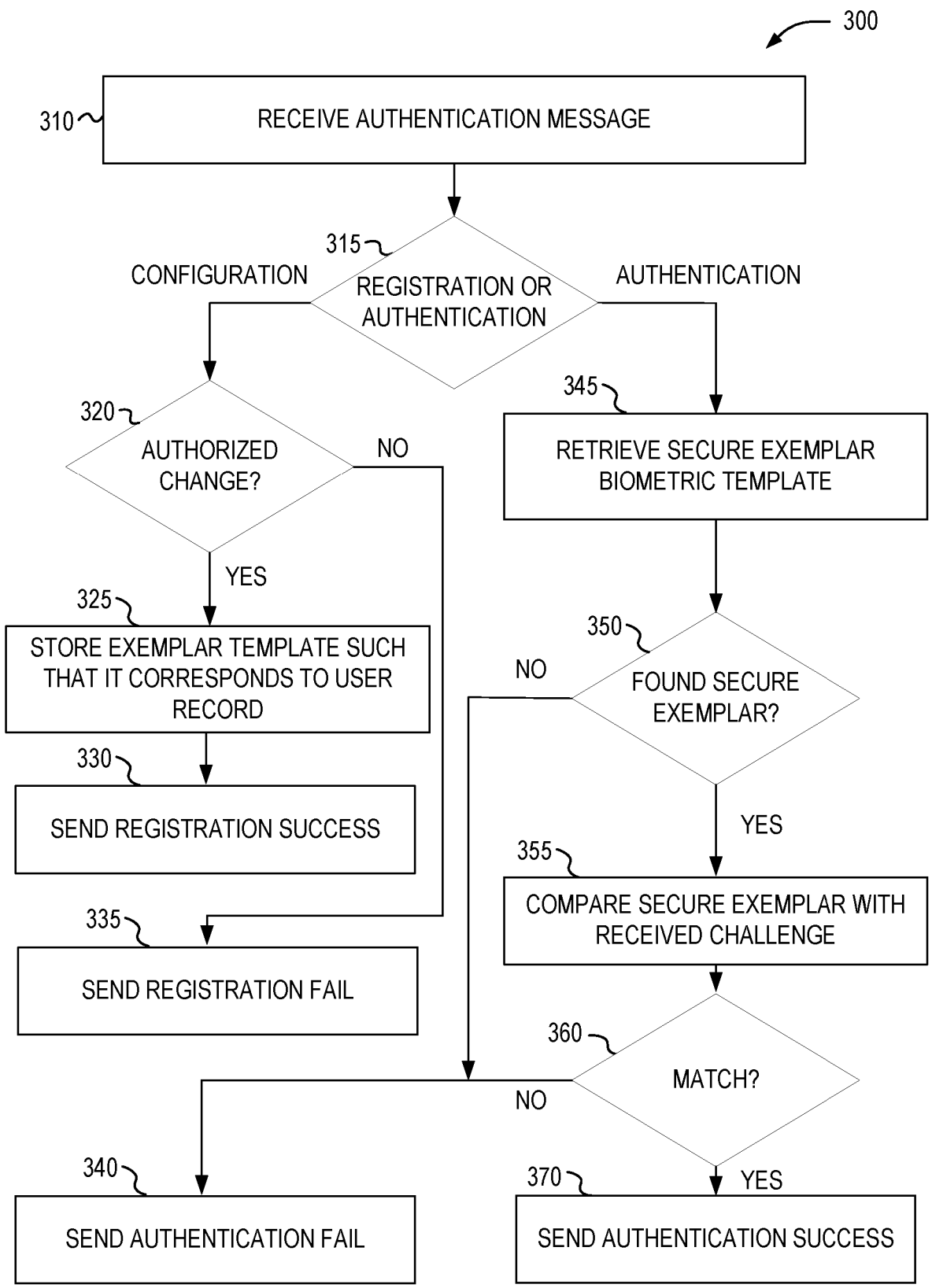
FIG. 3 illustrates a flowchart of a method 300 of an authentication service according to some examples of the present disclosure.

FIG. 3 illustrates a flowchart of a method 300 of an authentication service according to some examples of the present disclosure. At operation 310 a message related to an authentication function is received. For example, from a computing device such as computing device 101 or 102 of FIG. 1. The message may be received over one or more communications networks. Example network types may include one or more packet-based networks, circuit switched networks, and the like. Specific communication network examples include the Internet, a Wide Area Network (WAN), a Local Area Network (LAN), a Plain Old Telephone System (POTS) network, and the like. In other examples, the method steps of FIG. 3 may be performed on the user computing devices themselves and thus the message may be received through inter-process communication techniques, mailboxes, events, function calls, shared memory, and the like.

The message may include one or more of a protected exemplar template (e.g., such as protected exemplar template 116), a secure challenge template (e.g., protected challenge template 130), user identifier, a message type identifying the type of message, and the like. A determination may be made at operation 315 (e.g., using the message type) that evaluates whether the message is a configuration operation or an authentication attempt. Configuration operations include registration of new users, changing the biometric exemplar stored for the user, and the like. Authentication attempts are requests to authenticate a user against a stored exemplar template.

If the message is a configuration message, for registering an exemplar biometric template or replacing an existing biometric template, the system determines if the user is authorized to proceed at operation 320. For example, whether the user is allowed to register with the authorization system, whether the user is authorized to replace their existing biometric exemplar template, and the like. For example, the user may provide a username, password, biometric, user id, or other identifier. The user's credentials may be checked at operation 320 to ensure they are valid. In some examples, new accounts may be created at operation 320. At operation 325, if the user is authorized, the encrypted exemplar template may be stored and may be linked to the user's account. At operation 330 a success message may be returned. If the user is not authorized, then at operation 335, the authentication system may return an error. In some examples, rather than the computing device performing the encryption of the exemplar template, the computing device may send an unprotected template (e.g., the exemplar biometric template 110-A) and the selection biometric template 111-A or the encryption parameters 114. The authentication service may then encrypt the exemplar template 110-A for storage using encryption parameters.

If at operation 315 the message is requesting authentication of the user, the system may retrieve the secure exemplar biometric template at operation 345. For example, the system may locate a stored user profile of the user that matches a user identification provided in the request message received at operation 310. The protected exemplar biometric template may be retrieved from local storage, from a network-based authentication service (e.g., in examples in which the exemplar biometric template may be stored in the network-based authentication service but the comparison may be done on a local machine), and the like. At operation 350 a check is made to determine whether the protected exemplar was found. If not, then at operation 340 the system may return a failure. If the protected exemplar template was found, then at operation 355 the secure biometric exemplar template may be compared to a template provided in the request message received at operation 310 (e.g., the challenge template). As noted, if the templates match, or are within a threshold distance of each other, the system may determine at operation 360 that they match, and at operation 370 send a success message granting access to one or more computing devices. If the templates do not match, then at operation 340 the system may send a failure message.

Figure 4:
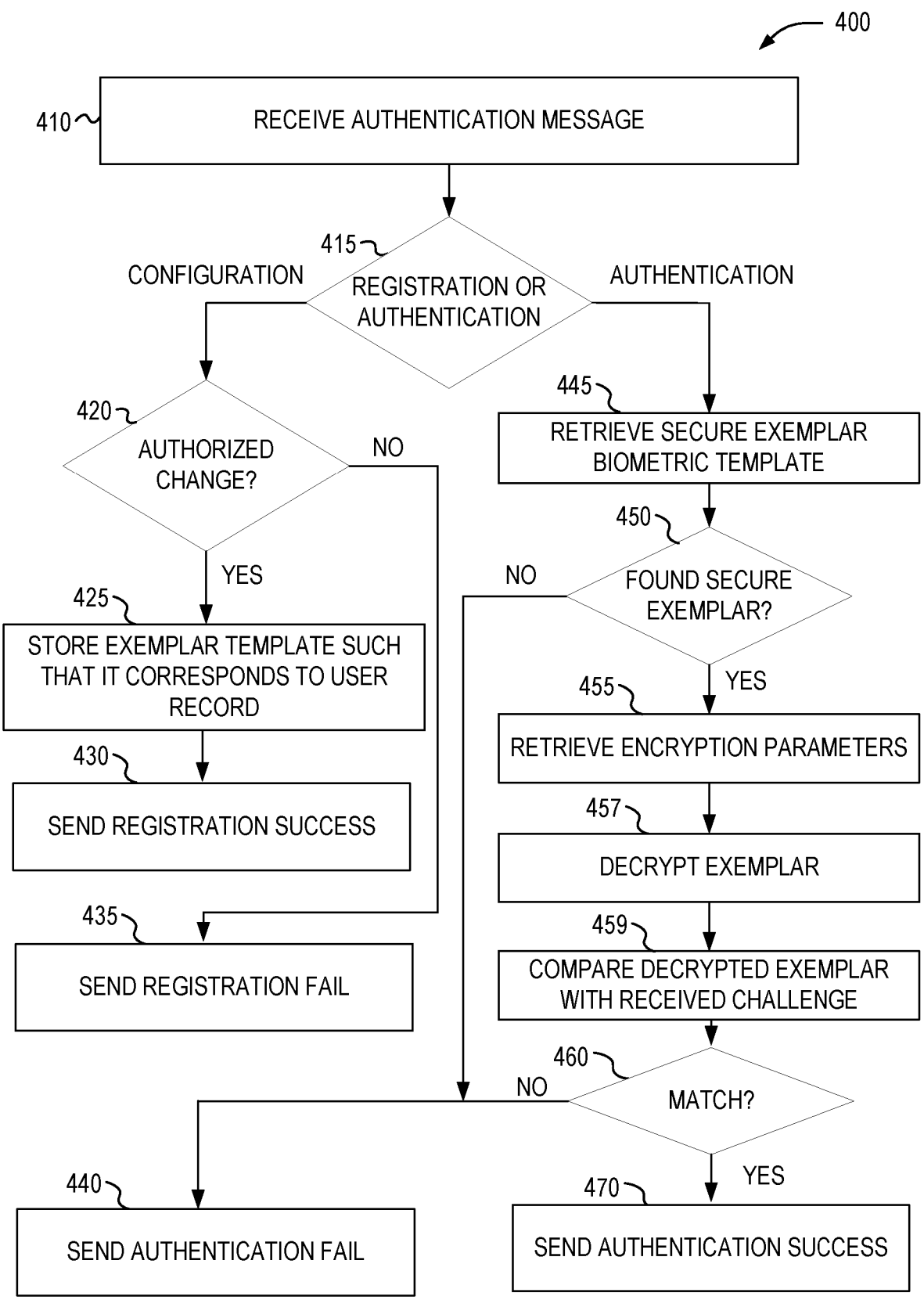
FIG. 4 illustrates a flowchart of a method of an authentication service according to some examples of the present disclosure.

FIG. 4 illustrates a flowchart of a method 400 of an authentication service according to some examples of the present disclosure. FIG. 4 shows an example in which the authentication service decrypts the protected exemplar to perform the comparison. At operation 410 a message related to an authentication function is received. For example, from a computing device such as computing device 101 or 102 of FIG. 1. The message may be received over one or more communications networks. Example network types may include one or more packet-based networks, circuit switched networks, and the like. Specific communication network examples include the Internet, a Wide Area Network (WAN), a Local Area Network (LAN), a Plain Old Telephone System (POTS) network, and the like. In other examples, the method steps of FIG. 4 may be performed on the user computing devices themselves and thus the message may be received through inter-process communication techniques, mailboxes, events, function calls, shared memory, and the like.

The message may include one or more of a protected exemplar template (e.g., such as protected exemplar template 116), a secure challenge template (e.g., protected challenge template 130), user identifier, a message type identifying the type of message, and the like. A determination may be made at operation 415 (e.g., using the message type) that evaluates whether the message is a configuration operation or an authentication attempt. Configuration operations include registration of new users, changing the biometric exemplar stored for the user, and the like. Authentication attempts are requests to authenticate a user against a stored exemplar template.

If the message is requesting a configuration operation (e.g., for registering an exemplar biometric template or replacing an existing biometric template) the system determines if the user is authorized to proceed at operation 420. For example, whether the user is allowed to register with the authorization system, whether the user is authorized to replace their existing biometric exemplar template, and the like. For example, the user may provide a username, password, biometric, user id, or other identifier. The user's credentials may be checked at operation 420 to ensure they are valid. In some examples, new accounts may be created at operation 420. At operation 425, if the user is authorized, the exemplar template may be stored and may be linked to the user's account. At operation 430 a success message may be returned. If the user is not authorized, then at operation 435, the authentication system may return an error.

If the user is authorized to make the change, at operation 425, the protected exemplar template may be stored and may be linked to the user's account. For example, the user may provide a username, user id, or other identifier. The identifier may be checked at operation 420 to ensure it belongs to a valid account, or at operation 420 a new account may be created and at operation 425 the exemplar template may be stored and a link to that template may be stored in association or inside a user profile corresponding to the user. At operation 430 a success message may be returned. In some examples, rather than the computing device performing the encryption of the exemplar template, the computing device may send an unprotected template (e.g., the exemplar biometric template 110-A) and the selection biometric template 111-A or the encryption parameters 114. The authentication service may then encrypt the exemplar template 110-A for storage using encryption parameters.

If at operation 415 the message is requesting authentication of the user, the system may retrieve the protected exemplar biometric template at operation 445. For example, the system may locate a stored user profile of the user that matches a user identification provided in the request message received at operation 410. The protected exemplar biometric template may be retrieved from local storage, from a network-based authentication service (e.g., in examples in which the exemplar biometric template may be stored in the network-based authentication service but the comparison may be done on a local machine), and the like.

At operation 450 a check is performed to determine whether the protected exemplar was found. If not, then at operation 440 the system may return a failure. If the protected exemplar template was found, then at operation 455, the encryption parameters may be retrieved or determined— for example, by submitting a selection biometric template received in the authentication message at operation 410 to a parameter selector operating in the authentication service. At operation 457 the parameters are used to decrypt the exemplar template. At operation 459 the decrypted exemplar may be compared with the received challenge template. As noted, if the templates match, or are within a threshold distance of each other, the system may determine at operation 460 that they match, and at operation 470 send a success message granting access to one or more computing devices. If the templates do not match, then at operation 440 the system may send a failure message. In some examples, in order to ensure security, after the comparison is made at operation 459, the RAM of the system may be cleared of the unencrypted exemplar template.

Figure 5:
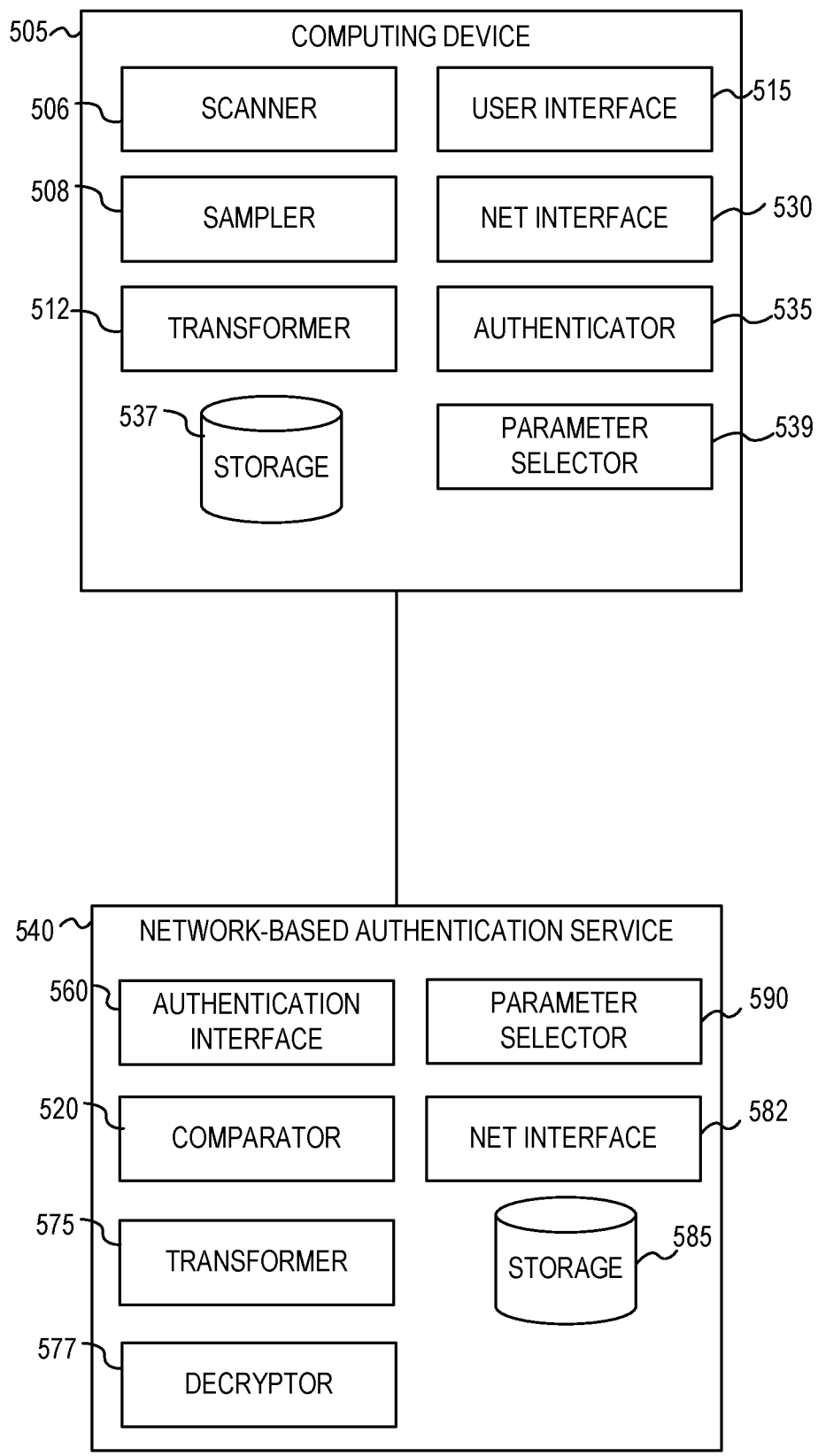
FIG. 5 illustrates a schematic of a user device and a network based authentication service according to some examples of the present disclosure.

FIG. 5 illustrates a schematic of a user computing device 505 and a network-based authentication service 540 according to some examples of the present disclosure. Components shown in FIG. 5 may be implemented as hardware, software, or a combination of hardware and software and additional components not shown may be included. Components of the network-based authentication service 540 may be implemented by one or more computing devices such as server computing devices. As previously described, the user computing device 505 and the network-based authentication service 540 may be capable of communication using one or more communication networks, such as the Internet, a WAN, LAN, or the like. User computing device 505 may be an example of computing devices 101, and/or 102 of FIG. 1. Network-based authentication service 540 may be an example of network-based authentication service 140 of FIG. 1.

User computing device 505 may include one or more biometric scanners 506, such as a fingerprint sensor, a camera (for facial recognition), an iris scanner, a microphone (for a voice print), and the like. Scanner 506 may be an example of scanner 106-A, 106-B, 107-A and/or 107-B of FIG. 1. Scanner 506 may generate a digital representation of one or more biometrics of the user. For example, an image of a person's face, an image of an iris, an image of a fingerprint, and the like. Sampler 508 may be an example of one or more of sampler 108-A, 109-A, 108-B, and/or 109-B from FIG. 1 and may convert the digital representation of the scanned biometric output by the scanner 506 to a series of one or more points—such as a matrix or vector of values. For example, sampler 508 may detect locations of ridges of a fingerprint; distances between ridges, valleys and other characteristics; locations of facial features; distances between facial features (e.g., distances between a nose and mouth) for facial recognition; voice patterns; patterns in an iris or retina; and the like to produce biometric data called a biometric template.

Parameter selector 539 may be an implementation of parameter selector 113-A and/or 113-B. Parameter selector 539 may utilize selection biometric template to select one or more encryption parameters for transformer 512. Transformer 512, which may be an example of transformer 112-A and/or 112-B. For example, the transformer 512 may apply one or more encryption functions using the encryption parameters determined by the parameter selector 539. The transformed template may be referred to as a protected template and stored in storage 537 or sent to network-based authentication service 540 for storage on storage 585. In some examples, encryption parameters are one or more parameters that are utilized to produce an encrypted biometric template and which contributes to the data in the final encrypted biometric template. That is, different encryption parameters may change the data in the final encrypted biometric template.

User interface 515 may provide one or more user interfaces to allow the user to enter or present their biometrics (e.g., to register) and to authenticate. User interface 515 may also present the one or more computer resources that are access restricted by the biometric authentication—that is, upon authentication the user interface 515 may present one or more user interface of one or more computer resources that were previously inaccessible to the user prior to authentication. Network interface 530 may provide one or more network interfaces and functionality for communicating using a communication network. Examples include providing communication protocols such as described by an IEEE 802.11 standard, an Ethernet standard, an Internet Protocol (IP) standard, a Transmission Control Protocol (TCP) standard, and the like. In addition, the network interface 530 may be configured to implement a protocol to communicate with the network-based authentication service through a defined protocol (e.g., a Representational state transfer (REST) protocol).

Authenticator 535 may, in conjunction with the user interface 515, scanner 506, sampler 508, parameter selector 539, transformer 512, storage 537, and network interface 530 create user interfaces, accept user input, and otherwise provide for a user to register a biometric exemplar, secure the biometric exemplar using the encryption (with parameters selected using a second biometric), attempt to later authenticate using a biometric, send the encrypted biometric template to a network-based authentication service (for storage or comparison) or store the encrypted biometric template locally and do the authentication (comparison) locally (including in some examples decrypting the stored biometric).

Network-based authentication service 540 may be an example of network-based authentication service 140 of FIG. 1. Comparator 520 compares two secure biometric templates, such as an exemplar biometric template and a challenge biometric template and determines whether they are close enough to constitute a match. For example, if they match within a predetermined level of similarity (e.g., distance).

Authentication interface 560 may interface with user computing device 505 and other computing devices to authenticate the user of the user computing device 505. For example, a third-party computing device may seek to authenticate a user through the use of biometrics. The third-party computing device may contact the authentication interface 560 to authenticate the user. The authentication interface 560 then requests that the user authenticate by sending an authentication request to the user computing device 505. The user computing device 505 then collects the biometrics, transforms the template using encryption, and sends it to the authentication interface 560. Authentication interface 560 then passes the received protected biometric template to the comparator 520. The authentication interface 560 then passes the result back to the third party requestor. In other examples, the protected computing resources may be on the user computing device 505. For example, the user of user computing device 505 may attempt to access a protected resource on the user computing device 505 (e.g., login to the device, unlock the device, access certain files and/or directories, and the like). The user computing device 505 may contact the authentication interface 560 of the network based authentication service 540 to authenticate the user. The result of the authentication may be sent back to the user computing device 505, which may allow the user (depending on the result) to access the protected resource. A protected resource is any computer data (e.g., file, message, program), functionality, or access that is restricted to particular users and for which a user must authenticate to access.

Parameter selector 590 functions as does parameter selector 539 in selecting one or more encryption parameters based upon a selection template. In examples in which the authentication service decrypts the encrypted exemplar template, the parameter selector 590 may determine one or more parameters that are used by decryptor 577 to decrypt an encrypted exemplar template. Decryptor 577 may use the function parameters to determine one or more keys to decrypt the encrypted stored exemplar template. Comparator 520 may then compare both the challenge template and the decrypted exemplar template to determine an authentication result. In examples in which the encrypted versions of the exemplar template and the challenge template are compared, the comparator 520 may compare these to determine if they match. In these examples, the user computing device 505 may include a quantizer to quantize the biometrics prior to encryption.

In some examples, the network-based authentication service may include a transformer 575. For example, during registration, if the computing devices (such as user computing device 505) send the unprotected exemplar template to the network-based authentication service, the transformer 575 uses the encryption parameters determined by the parameter selector 590 to encrypt it prior to storage. Additionally, in examples in which the exemplar templates and the challenge templates are compared in an encrypted state, the computing device may send an unencrypted challenge template (and the selection template) which may be encrypted by the transformer 575 prior to a comparison to an encrypted exemplar template.

Network interface 582 may provide one or more network interfaces and functionality for communicating using a communication network. Examples include providing communication protocols such as described by an IEEE 802.11 standard, an Ethernet standard, an Internet Protocol (IP) standard, a Transmission Control Protocol (TCP) standard, and the like. In addition, the network interface 582 may be configured to implement a protocol to communicate with the user computing device 505 through a defined protocol (e.g., a Representational state transfer (REST) protocol). Storage 585 may store protected exemplars, user identifiers and/or profiles, and the like.

While the disclosed embodiments focused on securing biometrics, the present disclosed use of encryption may be applicable to other types of information and data. For example, one or more secret values or biometrics may be used to select encryption parameters to secure other types of sensitive information such as other credentials of a user (such as usernames and/or passwords), user health data (e.g., for government requirements), social security numbers, government identification numbers, financial information, transaction information, bank account information, and the like as described herein for biometric data. For example, a biometric of a user may be utilized to select encryption parameters that are then used to encrypt sensitive information (such as a non-biometric secret of the user). The encrypted sensitive information may be stored in a network-based storage and then accessed later without fear of having the information stolen.

Figure 6:
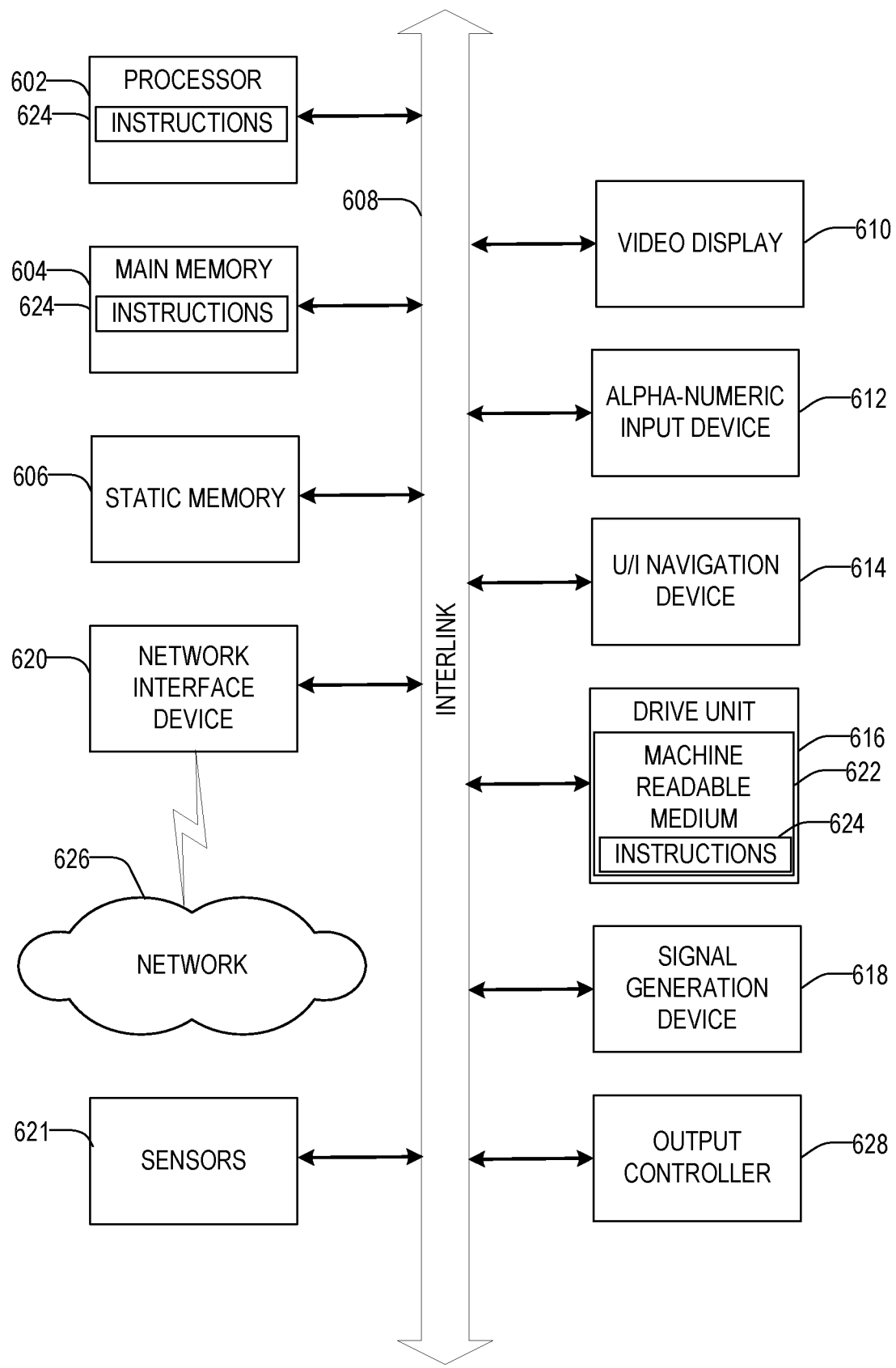
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be implemented. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a server of a network-based authentication service, a user device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. One or more machines 600 may implement the biometric system 100, network-based authentication service 540, user computing device 505, and be configured to perform the methods of FIG. 2-4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms ("modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is non-transitory, such as, not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a computing device for securing biometric data, the computing device comprising: one or more hardware processors; a memory, storing instructions, which when executed by the processor, cause the processor to perform operations comprising: receiving a first set of data points representing a biometric characteristic of a user; receiving a second set of data points representing a second biometric characteristic of the user; selecting at least one encryption parameter of an encryption function using the first set of data points; transforming the second set of data points to a third set of data points using the encryption function and the at least one encryption parameter; and transmitting the third set of data points to a network-based authentication service over a communications network.

In Example 2, the subject matter of Example 1 includes, wherein the encryption function is a McEliece encryption function, and wherein the at least one encryption parameter comprises one or more of: a binary linear code, a binary non-singular matrix, an error vector, or a permutation matrix.

In Example 3, the subject matter of Examples 1-2 includes, wherein the transmitting causes the network-based authentication service to store the second set of data points.

In Example 4, the subject matter of Examples 1-3 includes, wherein the operations further comprise: receiving a notification that the second set of data points matches a stored set of data points stored at the network-based authentication service; and providing access to the user to a resource provided by the one or more hardware processors based upon the notification.

In Example 5, the subject matter of Examples 1-4 includes, wherein the operations further comprise: receiving a notification that the second set of data points does not match a stored set of data points stored at the network-based authentication service; and denying access to a resource provided by the one or more hardware processors based upon the notification.

In Example 6, the subject matter of Examples 1-5 includes, wherein the operations of selecting the at least one encryption parameter of the encryption function comprises selecting the at least one encryption parameter also based upon a user specific value, the user specific value not corresponding to a representation of a biometric of the user.

In Example 7, the subject matter of Example 6 includes, wherein the operations further comprises: receiving an indication that the third set of data points was compromised, and in response: selecting second encryption parameters of the encryption function based upon the first set of data points and the user specific value; receiving a fourth set of data points representing the biometric characteristic of a user; transforming the received fourth set of data points to a fifth set of data points using the encryption function and the second encryption parameters; and transmitting the fifth set of data points to the network-based authentication service over the communications network.

In Example 8, the subject matter of Examples 1-7 includes, wherein the biometric characteristic and second biometric characteristic comprises different ones of: fingerprint data, iris data, facial recognition data, voice print data, or physiological data.

In Example 9, the subject matter of Examples 1-8 includes, wherein the encryption function is a McEliece encryption function that utilizes Goppa codes.

In Example 10, the subject matter of Examples 1-9 includes, wherein the encryption function is a Rivest-Shamir-Adleman (RSA) encryption function and wherein the at least one encryption parameter comprise a distinct prime number.

Example 11 is a method for securing biometric data, the method comprising: using one or more hardware processors: receiving a first set of data points representing a biometric characteristic of a user; receiving a second set of data points representing a second biometric characteristic of the user; selecting at least one encryption parameter of an encryption function using the first set of data points; transforming the second set of data points to a third set of data points using the encryption function and the at least one encryption parameter; and transmitting the third set of data points to a network-based authentication service over a communications network.

In Example 12, the subject matter of Example 11 includes, wherein the encryption function is a McEliece encryption function, and wherein the at least one encryption parameter comprises one or more of: a binary linear code, a binary non-singular matrix, an error vector, or a permutation matrix.

In Example 13, the subject matter of Examples 11-12 includes, wherein the transmitting causes the network-based authentication service to store the second set of data points.

In Example 14, the subject matter of Examples 11-13 includes, receiving a notification that the second set of data points matches a stored set of data points stored at the network-based authentication service; and providing access to the user to a resource provided by the one or more hardware processors based upon the notification.

In Example 15, the subject matter of Examples 11-14 includes, receiving a notification that the second set of data points does not match a stored set of data points stored at the network-based authentication service; and denying access to a resource provided by the one or more hardware processors based upon the notification.

In Example 16, the subject matter of Examples 11-15 includes, wherein selecting the at least one encryption parameter of the encryption function is also based upon a user specific value, the user specific value not corresponding to a representation of a biometric of the user.

In Example 17, the subject matter of Example 16 includes, wherein the method further comprises: receiving an indication that the third set of data points was compromised, and in response: selecting second encryption parameters of the encryption function based upon the first set of data points and the user specific value; receiving a fourth set of data points representing the biometric characteristic of a user; transforming the received fourth set of data points to a fifth set of data points using the encryption function and the second encryption parameters; and transmitting the fifth set of data points to the network-based authentication service over the communications network.

In Example 18, the subject matter of Examples 11-17 includes, wherein the biometric characteristic and second biometric characteristic comprises different ones of: fingerprint data, iris data, facial recognition data, voice print data, or physiological data.

In Example 19, the subject matter of Examples 11-18 includes, wherein the encryption function is a McEliece encryption function that utilizes Goppa codes.

In Example 20, the subject matter of Examples 11-19 includes, wherein the encryption function is a Rivest-Shamir-Adleman (RSA) encryption function and wherein the at least one encryption parameter comprise a distinct prime number.

Example 21 is a machine-readable medium, storing instructions for securing biometric data, the instructions, when performed by a machine, cause the machine to perform operations comprising: receiving a first set of data points representing a biometric characteristic of a user; receiving a second set of data points representing a second biometric characteristic of the user; selecting at least one encryption parameter of an encryption function using the first set of data points; transforming the second set of data points to a third set of data points using the encryption function and the at least one encryption parameter; and transmitting the third set of data points to a network-based authentication service over a communications network.

In Example 22, the subject matter of Example 21 includes, wherein the encryption function is a McEliece encryption function, and wherein the at least one encryption parameter comprises one or more of: a binary linear code, a binary non-singular matrix, an error vector, or a permutation matrix.

In Example 23, the subject matter of Examples 21-22 includes, wherein the transmitting causes the network-based authentication service to store the second set of data points.

In Example 24, the subject matter of Examples 21-23 includes, wherein the operations further comprise: receiving a notification that the second set of data points matches a stored set of data points stored at the network-based authentication service; and providing access to the user to a resource provided by the one or more hardware processors based upon the notification.

In Example 25, the subject matter of Examples 21-24 includes, wherein the operations further comprise: receiving a notification that the second set of data points does not match a stored set of data points stored at the network-based authentication service; and denying access to a resource provided by the one or more hardware processors based upon the notification.

In Example 26, the subject matter of Examples 21-25 includes, wherein the operations of selecting the at least one encryption parameter of the encryption function comprises selecting the at least one encryption parameter also based upon a user specific value, the user specific value not corresponding to a representation of a biometric of the user.

In Example 27, the subject matter of Example 26 includes, wherein the operations further comprises: receiving an indication that the third set of data points was compromised, and in response: selecting second encryption parameters of the encryption function based upon the first set of data points and the user specific value; receiving a fourth set of data points representing the biometric characteristic of a user; transforming the received fourth set of data points to a fifth set of data points using the encryption function and the second encryption parameters; and transmitting the fifth set of data points to the network-based authentication service over the communications network.

In Example 28, the subject matter of Examples 21-27 includes, wherein the biometric characteristic and second biometric characteristic comprises different ones of: fingerprint data, iris data, facial recognition data, voice print data, or physiological data.

In Example 29, the subject matter of Examples 21-28 includes, wherein the encryption function is a McEliece encryption function that utilizes Goppa codes.

In Example 30, the subject matter of Examples 21-29 includes, wherein the encryption function is a Rivest-Shamir-Adleman (RSA) encryption function and wherein the at least one encryption parameter comprise a distinct prime number.

Example 31 is a device for securing biometric data, the device comprising: means for receiving a first set of data points representing a biometric characteristic of a user; means for receiving a second set of data points representing a second biometric characteristic of the user; means for selecting at least one encryption parameter of an encryption function using the first set of data points; means for transforming the second set of data points to a third set of data points using the encryption function and the at least one encryption parameter; and means for transmitting the third set of data points to a network-based authentication service over a communications network.

In Example 32, the subject matter of Example 31 includes, wherein the encryption function is a McEliece encryption function, and wherein the at least one encryption parameter comprises one or more of: a binary linear code, a binary non-singular matrix, an error vector, or a permutation matrix.

In Example 33, the subject matter of Examples 31-32 includes, wherein the means for transmitting causes the network-based authentication service to store the second set of data points.

In Example 34, the subject matter of Examples 31-33 includes, means for receiving a notification that the second set of data points matches a stored set of data points stored at the network-based authentication service; and means for providing access to the user to a resource provided by the one or more hardware processors based upon the notification.

In Example 35, the subject matter of Examples 31-34 includes, means for receiving a notification that the second set of data points does not match a stored set of data points stored at the network-based authentication service; and means for denying access to a resource provided by the one or more hardware processors based upon the notification.

In Example 36, the subject matter of Examples 31-35 includes, wherein selecting the at least one encryption parameter of the encryption function is also based upon a user specific value, the user specific value not corresponding to a representation of a biometric of the user.

In Example 37, the subject matter of Example 36 includes, wherein the device further comprises: means for receiving an indication that the third set of data points was compromised, and in response: means for selecting second encryption parameters of the encryption function based upon the first set of data points and the user specific value; means for receiving a fourth set of data points representing the biometric characteristic of a user; means for transforming the received fourth set of data points to a fifth set of data points using the encryption function and the second encryption parameters; and means for transmitting the fifth set of data points to the network-based authentication service over the communications network.

In Example 38, the subject matter of Examples 31-37 includes, wherein the biometric characteristic and second biometric characteristic comprises different ones of: fingerprint data, iris data, facial recognition data, voice print data, or physiological data.

In Example 39, the subject matter of Examples 31-38 includes, wherein the encryption function is a McEliece encryption function that utilizes Goppa codes.

In Example 40, the subject matter of Examples 31-39 includes, wherein the encryption function is a Rivest-Shamir-Adleman (RSA) encryption function and wherein the at least one encryption parameter comprise a distinct prime number.

Example 41 is a computing device for authenticating a secure biometric, the computing device comprising: a hardware processor; a memory, storing instructions, which when executed, cause the hardware processor to perform operations comprising: receiving, from a computing device, a request to authenticate a user; identifying a selection biometric template representing a first biometric characteristic of the user; identifying a challenge biometric template representing a second biometric characteristic of the user; identifying an encrypted exemplar biometric template; decrypting the encrypted exemplar biometric template using the selection biometric template; comparing the decrypted exemplar biometric template to the challenge biometric template; and responsive to determining that the decrypted exemplar biometric template matches the challenge biometric template within a predetermined margin of error, producing an indication that the user is authenticated.

In Example 42, the subject matter of Example 41 includes, wherein the operations of identifying the selection biometric template and identifying the challenge biometric template comprises reading the selection biometric and challenge biometric from the request message.

In Example 43, the subject matter of Examples 41-42 includes, wherein the operations of identifying an encrypted exemplar biometric template comprises retrieving the encrypted exemplar biometric from a storage device.

In Example 44, the subject matter of Examples 41-43 includes, wherein the operations of decrypting the exemplar biometric template using the selection biometric template comprises: determining an encryption key from the selection biometric template; and decrypting the encrypted exemplar biometric template based upon the encryption key.

In Example 45, the subject matter of Examples 41-44 includes, wherein the operations of producing an indication that the user is authenticated comprises sending an authentication success to the computing device.

In Example 46, the subject matter of Examples 41-45 includes, wherein the operations of producing an indication that the user is authenticated comprises sending an authentication success to a second computing device.

In Example 47, the subject matter of Examples 41-46 includes, wherein the operations further comprise: responsive to determining that the decrypted exemplar biometric template does not match the challenge biometric template within the predetermined margin of error, producing an indication that the user is not authenticated.

Example 48 is a method of authenticating a secure biometric, the method comprising: using one or more hardware processors: receiving, from a computing device, a request to authenticate a user; identifying a selection biometric template representing a first biometric characteristic of the user; identifying a challenge biometric template representing a second biometric characteristic of the user; identifying an encrypted exemplar biometric template; decrypting the encrypted exemplar biometric template using the selection biometric template; comparing the decrypted exemplar biometric template to the challenge biometric template; and responsive to determining that the decrypted exemplar biometric template matches the challenge biometric template within a predetermined margin of error, producing an indication that the user is authenticated.

In Example 49, the subject matter of Example 48 includes, wherein identifying the selection biometric template and identifying the challenge biometric template comprises reading the selection biometric and challenge biometric from the request message.

In Example 50, the subject matter of Examples 48-49 includes, wherein identifying an encrypted exemplar biometric template comprises retrieving the encrypted exemplar biometric from a storage device.

In Example 51, the subject matter of Examples 48-50 includes, wherein decrypting the exemplar biometric template using the selection biometric template comprises: determining an encryption key from the selection biometric template; and decrypting the encrypted exemplar biometric template based upon the encryption key.

In Example 52, the subject matter of Examples 48-51 includes, wherein producing an indication that the user is authenticated comprises sending an authentication success to the computing device.

In Example 53, the subject matter of Examples 48-52 includes, wherein producing an indication that the user is authenticated comprises sending an authentication success to a second computing device.

In Example 54, the subject matter of Examples 48-53 includes, responsive to determining that the decrypted exemplar biometric template does not match the challenge biometric template within the predetermined margin of error, producing an indication that the user is not authenticated.

Example 55 is a machine-readable medium, storing instructions for authenticating a secure biometric, the instructions, which when executed by a machine, cause the machine to perform operations comprising: receiving, from a computing device, a request to authenticate a user; identifying a selection biometric template representing a first biometric characteristic of the user; identifying a challenge biometric template representing a second biometric characteristic of the user; identifying an encrypted exemplar biometric template; decrypting the encrypted exemplar biometric template using the selection biometric template; comparing the decrypted exemplar biometric template to the challenge biometric template; and responsive to determining that the decrypted exemplar biometric template matches the challenge biometric template within a predetermined margin of error, producing an indication that the user is authenticated.

In Example 56, the subject matter of Example 55 includes, wherein the operations of identifying the selection biometric template and identifying the challenge biometric template comprises reading the selection biometric and challenge biometric from the request message.

In Example 57, the subject matter of Examples 55-56 includes, wherein the operations of identifying an encrypted exemplar biometric template comprises retrieving the encrypted exemplar biometric from a storage device.

In Example 58, the subject matter of Examples 55-57 includes, wherein the operations of decrypting the exemplar biometric template using the selection biometric template comprises: determining an encryption key from the selection biometric template; and decrypting the encrypted exemplar biometric template based upon the encryption key.

In Example 59, the subject matter of Examples 55-58 includes, wherein the operations of producing an indication that the user is authenticated comprises sending an authentication success to the computing device.

In Example 60, the subject matter of Examples 55-59 includes, wherein the operations of producing an indication that the user is authenticated comprises sending an authentication success to a second computing device.

In Example 61, the subject matter of Examples 55-60 includes, wherein the operations further comprise: responsive to determining that the decrypted exemplar biometric template does not match the challenge biometric template within the predetermined margin of error, producing an indication that the user is not authenticated.

Example 62 is a device for authenticating a secure biometric, the device comprising: means for receiving, from a computing device, a request to authenticate a user; means for identifying a selection biometric template representing a first biometric characteristic of the user; means for identifying a challenge biometric template representing a second biometric characteristic of the user; means for identifying an encrypted exemplar biometric template; means for decrypting the encrypted exemplar biometric template using the selection biometric template; means for comparing the decrypted exemplar biometric template to the challenge biometric template; and means for responsive to determining that the decrypted exemplar biometric template matches the challenge biometric template within a predetermined margin of error, producing an indication that the user is authenticated.

In Example 63, the subject matter of Example 62 includes, wherein the means for identifying the selection biometric template and identifying the challenge biometric template comprises means for reading the selection biometric and challenge biometric from the request message.

In Example 64, the subject matter of Examples 62-63 includes, wherein the means for identifying an encrypted exemplar biometric template comprises means for retrieving the encrypted exemplar biometric from a storage device.

In Example 65, the subject matter of Examples 62-64 includes, wherein the means for decrypting the exemplar biometric template using the selection biometric template comprises: means for determining an encryption key from the selection biometric template; and means for decrypting the encrypted exemplar biometric template based upon the encryption key.

In Example 66, the subject matter of Examples 62-65 includes, wherein the means for producing an indication that the user is authenticated comprises means for sending an authentication success to the computing device.

In Example 67, the subject matter of Examples 62-66 includes, wherein the means for producing an indication that the user is authenticated comprises sending an authentication success to a second computing device.

In Example 68, the subject matter of Examples 62-67 includes, responsive to determining that the decrypted exemplar biometric template does not match the challenge biometric template within the predetermined margin of error, means for producing an indication that the user is not authenticated.

Example 69 is a computing device for securing data, the computing device comprising: one or more hardware processors; a memory, storing instructions, which when executed by the processor, cause the processor to perform operations comprising: receiving a first set of data points representing a biometric characteristic of a user; receiving an item of data; selecting at least one encryption parameter of an encryption function using the first set of data points; transforming the received item of data to a protected item of data using the encryption function and the at least one encryption parameter; and causing storage of the protected item of data.

In Example 70, the subject matter of Example 69 includes, wherein the encryption function is a McEliece encryption function, and wherein the at least one encryption parameter comprises one or more of: a binary linear code, a binary non-singular matrix, an error vector, or a permutation matrix.

In Example 71, the subject matter of Examples 69-70 includes, wherein the operations of causing storage of the protected item of data comprises one of: sending the protected item of data to a network-based server or storing the protected item of data locally.

In Example 72, the subject matter of Examples 69-71 includes, wherein the operations further comprise: transmitting the protected item of data; receiving a notification that the protected item of data matches a stored item of data at a network-based authentication service; and providing access to the user to a resource provided by the one or more hardware processors based upon the notification.

In Example 73, the subject matter of Examples 69-72 includes, wherein the operations further comprise: transmitting the protected item of data; receiving a notification that the protected item of data does not match a stored item of data at a network-based authentication service; and denying access to a resource provided by the one or more hardware processors based upon the notification.

In Example 74, the subject matter of Examples 69-73 includes, wherein the operations of selecting the at least one encryption parameter of the encryption function comprises selecting the at least one encryption parameter also based upon a user specific value, the user specific value not corresponding to a representation of a biometric of the user.

In Example 75, the subject matter of Example 74 includes, wherein the operations further comprises: receiving an indication that the protected item of data was accessed by an unauthorized person, and in response: selecting second encryption parameters of the encryption function based upon the first set of data points and the user specific value; transforming the item of data to a second protected item of data using the encryption function and the second encryption parameters; and causing replacement in storage of the protected item of data with the second protected item of data.

In Example 76, the subject matter of Examples 69-75 includes, wherein the biometric characteristic comprises one of: fingerprint data, iris data, facial recognition data, voice print data, or physiological data.

In Example 77, the subject matter of Examples 69-76 includes, wherein the encryption function is a McEliece encryption function that utilizes Goppa codes.

In Example 78, the subject matter of Examples 69-77 includes, wherein the encryption function is a Rivest-Shamir-Adleman (RSA) encryption function and wherein the at least one encryption parameter comprise a distinct prime number.

Example 79 is a machine-readable medium for securing data, the machine-readable medium comprising instructions, which when executed by a machine, causes the machine to perform operations comprising: receiving a first set of data points representing a biometric characteristic of a user;

receiving an item of data, selecting at least one encryption parameter of an encryption function using the first set of data points; transforming the received item of data to a protected item of data using the encryption function and the at least one encryption parameter; and causing storage of the protected item of data.

In Example 80, the subject matter of Example 79 includes, wherein the encryption function is a McEliece encryption function, and wherein the at least one encryption parameter comprises one or more of: a binary linear code, a binary non-singular matrix, an error vector, or a permutation matrix.

In Example 81, the subject matter of Examples 79-80 includes, wherein the operations of causing storage of the protected item of data comprises one of: sending the protected item of data to a network-based server or storing the protected item of data locally.

In Example 82, the subject matter of Examples 79-81 includes, wherein the operations further comprise: transmitting the protected item of data; receiving a notification that the protected item of data matches a stored item of data at a network-based authentication service; and providing access to the user to a resource provided by the one or more hardware processors based upon the notification.

In Example 83, the subject matter of Examples 79-82 includes, wherein the operations further comprise: transmitting the protected item of data; receiving a notification that the protected item of data does not match a stored item of data at a network-based authentication service; and denying access to a resource provided by the one or more hardware processors based upon the notification.

In Example 84, the subject matter of Examples 79-83 includes, wherein the operations of selecting the at least one encryption parameter of the encryption function comprises selecting the at least one encryption parameter also based upon a user specific value, the user specific value not corresponding to a representation of a biometric of the user.

In Example 85, the subject matter of Example 84 includes, wherein the operations further comprises: receiving an indication that the protected item of data was accessed by an unauthorized person, and in response: selecting second encryption parameters of the encryption function based upon the first set of data points and the user specific value; transforming the item of data to a second protected item of data using the encryption function and the second encryption parameters; and causing replacement in storage of the protected item of data with the second protected item of data.

In Example 86, the subject matter of Examples 79-85 includes, wherein the biometric characteristic comprises one of: fingerprint data, iris data, facial recognition data, voice print data, or physiological data.

In Example 87, the subject matter of Examples 79-86 includes, wherein the encryption function is a McEliece encryption function that utilizes Goppa codes.

In Example 88, the subject matter of Examples 79-87 includes, wherein the encryption function is a Rivest-Shamir-Adleman (RSA) encryption function and wherein the at least one encryption parameter comprise a distinct prime number.

Example 89 is a method for securing data, the method comprising: using one or more processors: receiving a first set of data points representing a biometric characteristic of a user; receiving an item of data; selecting at least one encryption parameter of an encryption function using the first set of data points, transforming the received item of data to a protected item of data using the encryption function and the at least one encryption parameter; and causing storage of the protected item of data.

In Example 90, the subject matter of Example 89 includes, wherein the encryption function is a McEliece encryption function, and wherein the at least one encryption parameter comprises one or more of: a binary linear code, a binary non-singular matrix, an error vector, or a permutation matrix.

In Example 91, the subject matter of Examples 89-90 includes, wherein causing storage of the protected item of data comprises one of: sending the protected item of data to a network-based server or storing the protected item of data locally.

In Example 92, the subject matter of Examples 89-91 includes, transmitting the protected item of data; receiving a notification that the protected item of data matches a stored item of data at a network-based authentication service; and providing access to the user to a resource provided by the one or more hardware processors based upon the notification.

In Example 93, the subject matter of Examples 89-92 includes, transmitting the protected item of data; receiving a notification that the protected item of data does not match a stored item of data at a network-based authentication service; and denying access to a resource provided by the one or more hardware processors based upon the notification.

In Example 94, the subject matter of Examples 89-93 includes, wherein selecting the at least one encryption parameter of the encryption function comprises selecting the at least one encryption parameter also based upon a user specific value, the user specific value not corresponding to a representation of a biometric of the user.

In Example 95, the subject matter of Example 94 includes, receiving an indication that the protected item of data was accessed by an unauthorized person, and in response: selecting second encryption parameters of the encryption function based upon the first set of data points and the user specific value; transforming the item of data to a second protected item of data using the encryption function and the second encryption parameters; and causing replacement in storage of the protected item of data with the second protected item of data.

In Example 96, the subject matter of Examples 89-95 includes, wherein the biometric characteristic comprises one of: fingerprint data, iris data, facial recognition data, voice print data, or physiological data.

In Example 97, the subject matter of Examples 89-96 includes, wherein the encryption function is a McEliece encryption function that utilizes Goppa codes.

In Example 98, the subject matter of Examples 89-97 includes, wherein the encryption function is a Rivest-Shamir-Adleman (RSA) encryption function and wherein the at least one encryption parameter comprise a distinct prime number.

Example 99 is a device for securing data, the device comprising: means for receiving a first set of data points representing a biometric characteristic of a user; means for receiving an item of data; means for selecting at least one encryption parameter of an encryption function using the first set of data points; means for transforming the received item of data to a protected item of data using the encryption function and the at least one encryption parameter; and means for causing storage of the protected item of data.

In Example 100, the subject matter of Example 99 includes, wherein the encryption function is a McEliece encryption function, and wherein the at least one encryption parameter comprises one or more of: a binary linear code, a binary non-singular matrix, an error vector, or a permutation matrix.

In Example 101, the subject matter of Examples 99-100 includes, wherein means for causing storage of the protected item of data comprises one of: means for sending the protected item of data to a network-based server or means for storing the protected item of data locally.

In Example 102, the subject matter of Examples 99-101 includes, means for transmitting the protected item of data; means for receiving a notification that the protected item of data matches a stored item of data at a network-based authentication service; and means for providing access to the user to a resource provided by the one or more hardware processors based upon the notification.

In Example 103, the subject matter of Examples 99-102 includes, means for transmitting the protected item of data; means for receiving a notification that the protected item of data does not match a stored item of data at a network-based authentication service; and means for denying access to a resource provided by the one or more hardware processors based upon the notification.

In Example 104, the subject matter of Examples 99-103 includes, wherein means for selecting the at least one encryption parameter of the encryption function comprises means for selecting the at least one encryption parameter also based upon a user specific value, the user specific value not corresponding to a representation of a biometric of the user.

In Example 105, the subject matter of Example 104 includes, means for receiving an indication that the protected item of data was accessed by an unauthorized person, and in response: means for selecting second encryption parameters of the encryption function based upon the first set of data points and the user specific value; means for transforming the item of data to a second protected item of data using the encryption function and the second encryption parameters; and means for causing replacement in storage of the protected item of data with the second protected item of data.

In Example 106, the subject matter of Examples 99-105 includes, wherein the biometric characteristic comprises one of: fingerprint data, iris data, facial recognition data, voice print data, or physiological data.

In Example 107, the subject matter of Examples 99-106 includes, wherein the encryption function is a McEliece encryption function that utilizes Goppa codes.

In Example 108, the subject matter of Examples 99-107 includes, wherein the encryption function is a Rivest-Shamir-Adleman (RSA) encryption function and wherein the at least one encryption parameter comprise a distinct prime number.

Example 109 is at least one machine-readable medium including instructions that, when executed by processing circuitry, cause the processing circuitry to perform operations to implement of any of Examples 1-108.

Example 110 is an apparatus comprising means to implement of any of Examples 1-108.

Example 111 is a system to implement of any of Examples 1-108.

Example 112 is a method to implement of any of Examples 1-108.

What is claimed is:

1. A computing device for securing biometric data, the computing device comprising:
a hardware processor;
a memory, storing instructions, which when executed by the hardware processor, cause the hardware processor to perform operations comprising:
receiving a first set of data points representing a biometric characteristic of a user, the biometric characteristic a first type of biometric;
receiving a second set of data points representing a second biometric characteristic of the user, the second biometric characteristic a second type of biometric, the first and second types being different types;
selecting at least one encryption parameter of an encryption function using the first set of data points;
transforming the second set of data points to a third set of data points using the encryption function and the at least one encryption parameter;
receiving a fourth set of data points as part of an access request, the fourth set of data points representing the first type of biometric;
receiving a fifth set of data points as part of the access request, the fifth set of data points representing the second type of biometric;
selecting at least one second encryption parameter of the encryption function using the fourth set of data points;
transforming the fifth set of data points to a sixth set of data points using the encryption function and the at least one second encryption parameter;
comparing, as part of an access request, the third set of data points directly to the sixth set of data points without decrypting the third set of data points; and
selectively granting access to a resource depending upon a result of the comparison of the third set of data points and the sixth set of data points.

2. The computing device of claim 1, wherein the encryption function is a McEliece encryption function, and wherein the at least one encryption parameter comprises one or more of: a binary linear code, a binary non-singular matrix, an error vector, or a permutation matrix.

3. The computing device of claim 1, wherein the operations further comprise storing the third set of data points and not storing the first and second sets of data points.

4. The computing device of claim 1, wherein the operations further comprise:
denying access to the resource if the comparison of the third set of data points to the sixth set of data points indicates that the third set of data points is over a threshold measure of difference from the sixth set of data points.

5. The computing device of claim 1, wherein the operations further comprise:
downsampling one of the first set and second sets of biometric characteristics prior to selecting the at least one encryption parameter of an encryption function using the first set of data points and transforming the second set of data points to a third set of data points using the encryption function and the at least one encryption parameter.

6. The computing device of claim 1, wherein the operations of selecting the at least one encryption parameter of the encryption function comprises selecting the at least one encryption parameter also based upon a user specific value, the user specific value not corresponding to a representation of a biometric of the user.

7. The computing device of claim 6, wherein the operations further comprises:
receiving an indication that the third set of data points was compromised, and in response:

selecting second encryption parameters of the encryption function based upon the first set of data points and the user specific value;

receiving a seventh set of data points representing the biometric characteristic of a user;

transforming the received seventh set of data points to an eighth set of data points using the encryption function and the second encryption parameters; and causing non-volatile storage of the eighth set of data points; and during a second access request, using the eighth set of data points instead of the third set of data points to authenticate the user.

8. The computing device of claim 1, wherein the biometric characteristic and second biometric characteristic comprises different ones of: fingerprint data, iris data, facial recognition data, voice print data, or physiological data.

9. The computing device of claim 1, wherein the encryption function is a McEliece encryption function that utilizes Goppa codes.

10. The computing device of claim 1, wherein the encryption function is a Rivest-Shamir-Adleman (RSA) encryption function and wherein the at least one encryption parameter comprise a distinct prime number.

11. A method for securing biometric data, the method comprising:

using one or more hardware processors:

receiving a first set of data points representing a biometric characteristic of a user, the biometric characteristic a first type of biometric;

receiving a second set of data points representing a second biometric characteristic of the user, the second biometric characteristic a second type of biometric, the first and second types being different types;

selecting at least one encryption parameter of an encryption function using the first set of data points;

transforming the second set of data points to a third set of data points using the encryption function and the at least one encryption parameter;

receiving a fourth set of data points as part of an access request, the fourth set of data points representing the first type of biometric;

receiving a fifth set of data points as part of the access request, the fifth set of data points representing the second type of biometric;

selecting at least one second encryption parameter of the encryption function using the fourth set of data points;

transforming the fifth set of data points to a sixth set of data points using the encryption function and the at least one second encryption parameter;

comparing, as part of an access request, the third set of data points directly to the sixth set of data points without decrypting the third set of data points; and selectively granting access to a resource depending upon a result of the comparison of the third set of data points and the sixth set of data points.

12. The method of claim 11, wherein the encryption function is a McEliece encryption function, and wherein the at least one encryption parameter comprises one or more of: a binary linear code, a binary non-singular matrix, an error vector, or a permutation matrix.

13. The method of claim 11, further comprising storing the third set of data points and not storing the first and second sets of data points.

14. The method of claim 11, wherein the encryption function is a McEliece encryption function that utilizes Goppa codes.

15. The method of claim 11, further comprising:

denying access to the resource if the comparison of the third set of data points to the sixth set of data points indicates that the third set of data points is over a threshold measure of difference from the sixth set of data points.

16. The method of claim 11, further comprising:

downsampling one of the first set and second sets of biometric characteristics prior to selecting the at least one encryption parameter of an encryption function using the first set of data points and transforming the second set of data points to a third set of data points using the encryption function and the at least one encryption parameter.

17. The method of claim 11, wherein selecting the at least one encryption parameter of the encryption function comprises selecting the at least one encryption parameter also based upon a user specific value, the user specific value not corresponding to a representation of a biometric of the user.

18. The method of claim 17, further comprising:

receiving an indication that the third set of data points was compromised, and in response:

selecting second encryption parameters of the encryption function based upon the first set of data points and the user specific value;

receiving a seventh set of data points representing the biometric characteristic of a user;

transforming the received seventh set of data points to an eighth set of data points using the encryption function and the second encryption parameters; and causing non-volatile storage of the eighth set of data points; and during a second access request, using the eighth set of data points instead of the third set of data points to authenticate the user.

19. A machine-readable storage device, storing instructions, which when executed by a machine, cause the machine to perform operations comprising:

receiving a first set of data points representing a biometric characteristic of a user, the biometric characteristic a first type of biometric;

receiving a second set of data points representing a second biometric characteristic of the user, the second biometric characteristic a second type of biometric, the first and second types being different types;

selecting at least one encryption parameter of an encryption function using the first set of data points;

transforming the second set of data points to a third set of data points using the encryption function and the at least one encryption parameter;

receiving a fourth set of data points as part of an access request, the fourth set of data points representing the first type of biometric;

receiving a fifth set of data points as part of the access request, the fifth set of data points representing the second type of biometric;

selecting at least one second encryption parameter of the encryption function using the fourth set of data points;

transforming the fifth set of data points to a sixth set of data points using the encryption function and the at least one second encryption parameter;

comparing, as part of an access request, the third set of data points directly to the sixth set of data points without decrypting the third set of data points; and selectively granting access to a resource depending upon a result of the comparison of the third set of data points and the sixth set of data points.

20. The machine-readable storage device of claim 19, wherein the encryption function is a McEliece encryption function that utilizes Goppa codes.

* * * * *